United States Patent [19]

Sugi et al.

[11] 4,255,567

[45] Mar. 10, 1981

[54] PROCESS FOR PRODUCING NBR WITH OCTYL-TO DECYL SULFATES

[75] Inventors: Nagatosh Sugi, Yokohama; Tetsu Ohishi, Tokyo, both of Japan

[73] Assignee: Nippon Zeon Co. Ltd., Tokyo, Japan

[21] Appl. No.: 11,921

[22] Filed: Feb. 13, 1979

[30] Foreign Application Priority Data

Feb. 14, 1978 [JP] Japan .................... 53/15631

[51] Int. Cl.³ .................. C08F 2/26; C08F 220/44
[52] U.S. Cl. ...................... 526/225; 526/94; 526/338
[58] Field of Search .................. 526/225, 94

[56] References Cited

U.S. PATENT DOCUMENTS

| | | | |
|---|---|---|---|
| 2,376,015 | 5/1945 | Semon | 526/338 X |
| 2,376,963 | 5/1945 | Garvey, Jr. | 526/338 X |
| 2,380,905 | 7/1945 | Stewart | 526/338 X |
| 3,975,461 | 8/1976 | Yamawaki | 526/85 X |
| 4,014,843 | 3/1977 | Xanthopoulo | 526/193 XR |

FOREIGN PATENT DOCUMENTS

| | | | |
|---|---|---|---|
| 7230300 | 8/1972 | Japan | 526/338 |
| 522982 | 7/1940 | United Kingdom | 526/338 |
| 913590 | 12/1962 | United Kingdom | 526/338 |

*Primary Examiner*—C. A. Henderson
*Attorney, Agent, or Firm*—Sherman & Shalloway

[57] ABSTRACT

NBR containing at least 10% by weight of combined acrylonitrile is produced by polymerizing acrylonitrile and butadiene in emulsion in the presence of a linear alkyl sulfate mixture containing at least 60% by weight of a linear alkyl sulfate having 6 to 10 carbon atoms.

5 Claims, No Drawings

PROCESS FOR PRODUCING NBR WITH OCTYL-TO DECYL SULFATES

This invention relates to a process for producing a solid acrylonitrile-butadiene copolymer rubber (to be abbreviated as NBR) containing at least 10% by weight of combined acrylonitrile. More specifically, this invention pertains to a process for producing NBR without causing manufacturing inconveniences often experienced in conventional processes, which comprises the emulsion-polymerization of acrylonitrile and butadiene in the presence of a linear alkyl sulfate having 6 to 10 carbon atoms.

Emulsifiers or dispersing agents used to produce NBR by emulsion polymerization generally require certain useful characteristics. For example, the resultant latex should have good mechanical stability during and after polymerization. When the latex is to be coagulated by adding an aqueous solution of a salt such as calcium chloride in order to obtain a solid rubber, the crumbs should have a moderate size. The emulsifiers or dispersants that remain after the polymerization should not adversely affect the characteristics of the solid rubber. Moreover, the waste water occurring in the manufacturing process should be easy to treat. The first two of these properties are of particular importance. If, for example, the latex has poor mechanical stability, a coagulum tends to be formed during the polymerization step, the monomer stripping step, the latex transferring step, etc. Furthermore, too fine particles of the crumb are inconvenient because during water removal by a vibratory screen, the crumbs are lost by passage through the screen. Hence, the mechanical stability of the latex and the moderate size of the crumbs are very important requirements in NBR preparation.

It is an object of this invention to provide an efficient process for producing NBR by discovering an emulsifier or dispersant which meets the aforesaid requirements for production of NBR by emulsion polymerization.

The present inventors found that a linear alkyl sulfate having 6 to 10 carbon atoms, more specifically a linear alkyl sulfate mixture containing at least 60% by weight of a linear alkyl sulfate containing 6 to 10 carbon atoms is an emulsifier or dispersant which meets the above object.

Thus, according to this invention, there is provided a process for producing NBR containing at least 10% by weight of combined acrylonitrile by polymerizing acrylonitrile and butadiene in emulsion in the presence of such a linear alkyl sulfate mixture.

The linear alkyl sulfate or its mixture is widely used in the emulsion polymerization of vinyl chloride, but is scarcely used in producing NBR by emulsion polymerization. As a rare example, G. S. Whitby, SYNTHETIC RUBBER, page 800 (John Wiley & Sons, Inc., N.Y. 1954) and Rubber Chem. & Technol., Vol. 37, No. 2 (Part 2), page 75 (1964) disclose a higher alkyl sulfate. Although this known technique can afford a relatively stable latex when this latex is coagulated with an aqueous solution of a salt such as calcium chloride, sodium chloride or aluminum sulfate, the crumbs have markedly fine sizes. Hence, this process is not suitable for producing NBR commercially.

When styrene, butadiene and a polar monomer (e.g., unsaturated carboxylic acids, amides, etc.) are subjected to emulsion-polymerization in the presence of the alkyl sulfate, a stable latex of a terpolymer is obtained. On the other hand, when styrene and butadiene are emulsion-polymerized in the presence of the alkyl sulfate in accordance with this invention, the stability of the latex obtained is not improved over the case of performing the emulsion polymerizatin in the presence of conventional emulsifiers such as potassium oleate, but is rather inferior. These facts show that the stability of the latex is retained by a combination of a polar monomer such as an unsaturated carboxylic acid and an alkyl sulfate as an emulsifier.

It is surprising therefore that when the alkyl sulfate in accordance with this invention is added as an emulsifier or dispersant to an emulsion-polymerization system containing acrylonitrile and butadiene and being free from a polar monomer which contributes to the stability of the latex as described above, the stability of the latex and the size of the crumbs are both very much improved over the case of using conventional emulsifiers or dispersants such as dodecylbenzenesulfonates, a salt of a condensate between naphthalenesulfonic acid and formaldehyde. It has also been unexpectedly found that such an effect of this invention cannot be obtained by using branched-chain alkyl sulfates.

The emulsion-polymerization process of this invention which comprises polymerizing acrylonitrile and butadiene in the presence of a linear alkyl sulfate mixture containing at least 60% by weight of a linear alkyl sulfate containing 6 to 10 carbon atoms (general formula $R\text{-}OSO_3M$ in which R is a linear alkyl group having 6 to 10 carbon atoms and M is a monovalent cation such as Na, K, or $NH_4$ can afford an NBR latex which has superior mechanical stability and gives crumbs having a moderate size when coagulated as compared with the case of using conventional emulsifiers or dispersants. In addition, since the number of carbon atoms of the alkyl group in the alkyl sulfate used in this invention is smaller than that of conventionally used alkyl sulfates, it tends to be washed away with water during the step of washing the crumbs, and the amount of the remaining alkyl sulfate in the solid rubber decreases. Thus, according to this invention, rubber having a high purity is obtained, and the soiling of the mold during the molding step and the tendency of the final product to corrode metal are removed. As another advantage obtained by this invention, the linear alkyl sulfates used in this invention have good biodegradability, and the waste water can be easily treated.

The linear alkyl sulfates having 6 to 10 carbon atoms can be used either singly or as an alkyl sulfate mixture containing them as a main ingredient. In the case of the mixture, the amount of the linear aklyl sulfates having 6 to 10 carbon atoms should be at least 60% by weight based on the total alkyl sulfate mixture. The object of this invention cannot be achieved by the use of alkyl sulfates having a side chain in the alkyl group.

The amount of the linear alkyl sulfate mixture used in this invention is usually such that the amount of the linear alkyl sulfates having 6 to 10 carbon atoms is 0.1 to 10.0 parts be weight, preferably 0.2 to 0.6 parts by weight, per 100 parts by weight of the entire monomers to be polymerized.

A part of the linear alkyl sulfate mixture may be replaced by conventional emulsifiers or dispersants. By so doing, the favorable characteristics of the linear alkyl sulfates used in this invention can be balanced with those of the conventional emulsifiers or dispersants. It is especially desirable to use linear alkyl sulfates having 6 to 8 atoms in combination with other emulsifiers or dispersants.

Examples of the emulsifiers or dispersants that can be used in combination with the linear alkyl sulfates used in this invention include fatty acid salts; disproportionated rosin acid salts; alkanesulfonate salts; α-olefinsulfonate salts; salts of benzenesulfonic acid derivatives typified by alkylbenzenesulfonates; and naphthalenesulfonic acid derivatives typified by alkylnaphthalenesulfonates and a salt of a condensate between naphthalenesulfonic acid and formaldehyde.

The process of this invention is applicable to the production of NBR containing at least 10% by weight of combined acrylonitrile. It is especially effective when applied to the production of NBR containing 15 to 55% by weight of combined acrylonitrile.

The polymerization in accordance with this invention can be performed by usual aqueous emulsion-polymerization techniques. As required, known polymerization initiators, molecular weight regulators, salts, chelating agents, etc. can be used. The polymerization can be carried out either at high temperatures or at low temperatures. After the polymerization, the resulting latex is coagulated with an ordinary coagulating agent, i.e. an aqueous solution of a salt such as calcium chloride, sodium chloride or aluminum sulfate to form solid NBR.

The following non-limitative Examples specifically illustrate the present invention.

EXAMPLE 1

(1) Production of NBR

A latex was obtained from the following polymerization recipe by reaction in an autoclave at 5° C. until the conversion reached 84%.

Polymerization recipe:

| Ingredients | Amounts (parts by weight) |
| --- | --- |
| Emulsifier or dispersant shown in Table 1 | 2.5 |
| Sodium carbonate | 0.1 |
| Deionized water | 190 |
| Acrylonitrile | 34 |
| Butadiene | 66 |
| Trisodium ethylenediamine-tetraacetate | 0.03 |
| Tertiary dodecyl mercaptan | 0.4 |
| Ferrous sulfate (FeSO$_4$.7H$_2$O) | 0.005 |
| Sodium formaldehyde sulfoxylate | 0.05 |
| p-Menthane hydroperoxide | 0.06 |

(2) Measurement of the mechanical stability of the latex 250 g of the latex from which the remaining butadiene had been removed was placed in a Hamilton Beach Mixer (No. 51 Drinkmaster), and stirred at about 50° C. for 5 minutes at a rotating speed of 11,000 rpm. The dry weight of the resulting coagulum, based on the total solids content of the sample latex, was measured. The results are shown in Table 1 under the headline "Coagulum, %, obtained by high-speed stirring". Latices having low coagulum percentages have good mechanical stability, and are therefore preferred.

(3) Rating of the size of crumbs

One part by volume of the latex was poured with strong agitation into 2 parts by volume of 0.3% by weight aqueous solution of calcium chloride as a coagulating agent to form crumbs which were then passed over a 20 mesh (Tayler mesh) wire gauze together with the coagulating solution. The size of the crumbs was evaluated from the amount of the crumbs which passed through the wire gauze. Fine crumbs which pass through 20-mesh wire gauze are undesirable.

The results are shown in Table 1.

TABLE 1

| Run No. | Type of the emulsifier or dispersant | Coagulum, %, obtained by high-speed stirring | Size of the crumbs |
| --- | --- | --- | --- |
| 1 (invention) | Sodium alkylsulfate mixture consisting mainly of sodium linear alkylsulfate containing 10 carbon atoms | 2.30 | The crumbs did not pass through the 20-mesh wire gauze. |
| 2 (comparison) | Sodium dodecylbenzene-sulfonate | 9.48 | 1-2% of the entire crumbs passed through the 20-mesh wire gauze. |

The composition of the sodium alkylsulfate mixture in Run. No. 1 was as follows:

| | |
| --- | --- |
| Sodium linear alkylsuflate having 8 carbon atoms | 1% by weight |
| Sodium linear alkylsulfate having 10 carbon atoms | less than 93% by weight |
| Sodium linear alkylsulfate having 12 carbon atoms | more than 3% by weight |
| Others | less than 3% by weight |

The composition was determined by subjecting to gas chromatography a higher alcohol mixture which had been obtained by hydrolyzing the sodium alkylsulfate mixture in a sulfuric acid-acidified condition.

EXAMPLE 2

(1) Production of NBR

The same polymerization recipe and polymerization conditions as in Example 1 were employed except tht 2.0 parts by weight of each of the emulsifiers or dispersants shown in Table 2 was used, and 0.5 part by weight of a sodium salt of a naphthalenesulfonic aic/formaldehyde condensate was additionally used.

(2) Measurement of the mechanical stability of the latex

The dry weight of the coagulum formed at the end of the polymerization in the autoclave, based on the total solids content of the latex in the autoclave, was measured, and shown in Table 2 under the headline "Coagulum, %, obtained by polymerization". The "coagulum, %, obtained by high-speed stirring" was also measured in the same way as in Example 1.

(3) Rating of the size of the crumbs

This was performed by the same method as used in Example 1.

The results are shown in Table 2.

TABLE 2

| Run No. | | Type of the emulsifier or dispersant | Stability of the latex | | Size of the crumbs |
|---|---|---|---|---|---|
| | | | Coagulum, %, obtained by polymerization | Coagulum, %, obtained by high-speed stirring | |
| Invention | 3 | Sodium alkylsulfate mixture consisting mainly of sodium linear alkylsulfate ($C_8$) | 0.25 | 4.52 | The crumbs did not pass through the 20-mesh wire gauze. |
| | 4 | Sodium alkylsulfate mixture consisting mainly of sodium linear alkylsulfate ($C_{10}$) | 0.10 | 2.46 | The crumbs did not pass through the 20-mesh wire gauze. |
| Comparison | 5 | Sodium alkylsulfate mixture consisting of sodium linear alkylsulfates ($C_{12-16}$) | 0.30 | 5.32 | 10 to 20% of the entire crumbs passed through the 20-mesh wire gauze. |
| | 6 | Sodium dodecylbenzene-sulfonate | 0.38 | 6.20 | 1 to 2% of the entire crumbs passed through the 20-mesh wire gauze. |

The compositions of the sodium alkylsulfate mixtures used in Runs Nos. 3, 4 and 5, which were determined by the same method as described above with regard to Table 1, Run No. 1, were as follows:

Run No. 3
| | |
|---|---|
| Sodium liner alkylsulfate having 8 carbon atoms | more than 97% by weight |
| Sodium linear alkylsulfate having 10 carbon atoms | 2% by weight |
| Others | less than 1% by weight |

Run No. 4
| | |
|---|---|
| Sodium linear alkylsulfate having 8 carbon atoms | 1% by weight |
| Sodium linear alkylsulfate having 10 carbon atoms | more than 93% by weight |
| Sodium linear alkylsulfate having 12 carbon atoms | less than 3% by weight |
| Others | less than 3% by weight |

Run No. 5
| | |
|---|---|
| Sodium linear alkylsulfate having 10 carbon atoms | less than 2% by weight |
| Sodium linear alkylsulfate having 12 carbon atoms | 64% by weight |
| Sodium linear alkylsulfate having 14 carbon atoms | 22% by weight |
| Sodium linear alkylsulfate having 16 carbon atoms | 12% by weight |
| Sodium linear alkylsulfate having 18 carbon atoms | less than 2% by weight |

EXAMPLE 3

(1) Production of NBR

The same polymerization recipe and polymerization conditions as in Example 1 were used except that 2.0 parts by weight of each of the emulsifiers or dispersants indicated in Table 3 was used, and 0.5 part by weight of potassium oleate was additionally employed.

(2) Mechanical stability of the latex

The "coagulum, %, obtained by high-speed stirring" was measured by the same method as described in Example 1.

(3) Rating of the size of the crumbs

The size was determined by the same method as in Exmaple 1.

The results are shown in Table 3.

TABLE 3

| Run No. | | Type of the emulsifier or dispersant | Coagulum, %, obtained by high-speed stirring | Size of the crumbs |
|---|---|---|---|---|
| Invention | 7 | Sodium alkylsulfate mixture consisting mainly of sodium linear alkyl-sulfate ($C_8$) | 4.84 | The crumbs did not pass through the 20-mesh wire gauze. |
| | 8 | Sodium alkylsulfate mixture consisting mainly of sodium linear alkyl-sulfate ($C_{10}$) | 2.03 | The crumbs did not pass through the 20-mesh wire gauze. |
| Comparison | 9 | Sodium alkylsulfate mixture consisting mainly of sodium linear alkyl-sulfates ($C_{12-16}$) | 6.52 | 10 to 20% of the entire crumbs passed through the 20- |

TABLE 3-continued

| Run No. | Type of the emulsifier or dispersant | Coagulum, %, obtained by high-speed stirring | Size of the crumbs |
| --- | --- | --- | --- |
| 10 | Sodium 2-ethylhexylsulfate | 19.12 | mesh wire gauze. The crumbs did not pass the 20-mesh wire gauze. |
| 11 | Sodium salt of naphthalenesulfonic acid/formaldehyde condensate | 8.09 | The crumbs did not pass the 20-mesh wire gauze. |

The sodium alkylsulfate mixtures used in Runs Nos. 7, 8 and 9 were the same as those used in Runs Nos. 3, 4 and 5.

Run No. 10 used sodium 2-ethylhexylsulfate in which the alkyl is not linear. A comparison of Run No. 10 with Run No. 7 shows that because the alkyl group is not linear, the latex obtained in Run No. 10 has far inferior mechanical stability.

It is seen from Examples 1 to 3 that the process for polymerization in accordance with this invention can give latices having good mechanical stability and moderate crumb sizes which are the two important requirements as stated hereinabove.

What we claim is:

1. A process for producing an acrylonitrilebutadiene copolymer rubber by emulsion polymerization which, when coagulated, provides solid copolyer crumbs having a particle size greater than 20 mesh, said process comprising emulsion polymerizing acrylonitrile and butadiene in an aqueous emulsion system consisting essentially of water, acrylonitrile in an amount sufficent to provide at least 10% by weight of combined acrylonitrile in the copolymer, butadiene, and an emulsifier system comprising at least 60% by weight of a linear alkyl sulfate having 8 to 10 carbon atoms.

2. The process of claim 6 wherein the amount of the linear alkyl sulfate having 8 to 10 carbon atoms is 0.1 to 10.0 parts by weight per 100 parts by weight of the total monomers.

3. The process of claim 6 wherein the amount of the linear alkyl sulfate having 8 to 10 carbon atoms is 0.2 to 6.0 parts by weight per 100 parts by weight of the total monomers.

4. The process of claim 1 wherein the acrylonitrile-butadiene copolymer rubber contains from 15 to 55% by weight of combined acrylonitrile.

5. The process of claim 2 wherein the acrylonitrile-butadiene copolymer rubber contains from 15 to 55% by weight of combined acrylonitrile.

* * * * *

UNITED STATES PATENT AND TRADEMARK OFFICE
CERTIFICATE OF CORRECTION

PATENT NO. : 4,255,567
DATED : March 10, 1981
INVENTOR(S) : Nagatoshi Sugi and Tetsu Ohishi It is certified that error appears in the above—identified patent and that said Letters Patent is hereby corrected as shown below:

Page 1, item [75]. Please change "Nagatosh" to read
--Nagatoshi--.

Signed and Sealed this

Nineteenth Day of May 1981

[SEAL]

Attest:

RENE D. TEGTMEYER

Attesting Officer

Acting Commissioner of Patents and Trademarks